United States Patent [19]

Cheng

[11] Patent Number: 4,683,139
[45] Date of Patent: Jul. 28, 1987

[54] PROCESS FOR PREPACKING FRESH MEAT

[75] Inventor: Chin S. Cheng, Oklahoma City, Okla.

[73] Assignee: Wilson Foods Corporation, Oklahoma City, Okla.

[21] Appl. No.: 806,609

[22] Filed: Dec. 9, 1985

Related U.S. Application Data

[63] Continuation-in-part of Ser. No. 753,958, Jul. 11, 1985, abandoned.

[51] Int. Cl.⁴ .................. A23B 4/00; A23B 4/02; A23B 4/12
[52] U.S. Cl. .................. 426/265; 426/264; 426/281; 426/324; 426/332; 426/316; 426/396; 426/418; 426/398; 426/124; 426/129
[58] Field of Search .............. 426/264, 265, 418, 124, 426/332, 129, 396, 281, 324, 316, 398

[56] References Cited

U.S. PATENT DOCUMENTS

| | | | |
|---|---|---|---|
| T861,046 | 4/1969 | Titchenal et al. | 426/108 |
| 2,177,519 | 10/1939 | Doyle | 426/265 |
| 2,772,172 | 11/1956 | Carson | 426/129 |
| 2,992,115 | 7/1961 | Sair | 426/265 |
| 3,154,421 | 10/1964 | Voegeli et al. | 426/265 |
| 3,154,423 | 10/1964 | Voegeli et al. | 426/265 |
| 3,351,265 | 11/1967 | Miller | 426/418 |
| 3,360,382 | 12/1967 | Miller | 426/418 |
| 3,386,836 | 6/1968 | Borenstein et al. | |
| 3,502,241 | 3/1970 | Smith | 206/561 |
| 3,574,642 | 4/1971 | Weinke | 426/124 |
| 3,677,774 | 7/1972 | Rausing | |
| 3,681,092 | 8/1972 | Titchenal | 426/415 |
| 3,713,849 | 1/1973 | Grindrod et al. | 426/415 |
| 3,814,821 | 6/1974 | Oliver et al. | 426/265 |
| 3,851,080 | 11/1974 | Lugg et al. | 426/418 |
| 3,930,040 | 12/1975 | Woodruff | 426/418 |
| 3,958,390 | 5/1976 | Pringle, Jr. et al. | |
| 4,054,207 | 10/1977 | Lazure et al. | 426/108 |
| 4,055,672 | 10/1977 | Hirsch | 426/127 |
| 4,056,639 | 11/1977 | Schwarz | 426/265 |
| 4,275,811 | 6/1981 | Miller | 426/129 |
| 4,416,909 | 11/1983 | Aversano | 426/265 |
| 4,515,266 | 5/1985 | Myers | 206/205 |
| 4,522,835 | 6/1985 | Woodruff et al. | 426/418 |
| 4,548,824 | 10/1985 | Mitchell et al. | 426/129 |

FOREIGN PATENT DOCUMENTS

| | | | |
|---|---|---|---|
| 843886 | 6/1970 | Canada | |
| 2538681 | 3/1977 | Fed. Rep. of Germany | 426/418 |
| 2290153 | 4/1976 | France | |
| 1245227 | 9/1971 | United Kingdom | 426/265 |
| 1251644 | 10/1971 | United Kingdom | 426/265 |
| 1378140 | 12/1974 | United Kingdom | 426/124 |
| 1379263 | 1/1975 | United Kingdom | 426/129 |
| 2003836 | 3/1979 | United Kingdom | 426/124 |

OTHER PUBLICATIONS

Elements of Food Technology, Desrosier, 1977, Avi Publ., pp. 330, 331.
Food Packaging, Sacharow, Sacharow 1970, Avi Publ.
J. of Agricultural Food Chem., 1975, vol. 23, #6, p. 1208+.
Modern Packaging, 10/69, p. 183+.
Food Technology, 4/55, p. 194+.
Broiler Industry, 6/76, p. 14+.
Cellu-Products, Publ. 1/80.

Primary Examiner—Steven Weinstein
Attorney, Agent, or Firm—William R. Laney

[57] ABSTRACT

A process for prepacking fresh meat to enhance and improve the consistency of its quality at the point of retail sale, and to increase the shelf life of the meat, such process including the steps of treating the meat with an aqueous solution containing three active components, and then packaging the meat in a controlled gaseous atmosphere containing from about 20 to about 80 percent carbon dioxide, and from about 2 to about 30 percent oxygen, with the balance being nitrogen. The solutions active components include certain phosphate compounds and a reducing agent which is selected from the group consisting of ascorbic acid, isoascorbic acid, or the sodium and potassium salts of these acids, and reductic acid. The third ingredient is either citric acid or tartaric acid, or ethylenediaminetetracetic acid, or an alkali metal salt thereof, functioning as a sequestering agent.

15 Claims, 23 Drawing Figures

PROCESS FOR PREPACKING FRESH MEAT

RELATED APPLICATION

This application is a continuation-in-part of U.S. patent application Ser. No. 753,958 filed on July 11, 1985, now abandoned, and entitled "Process for Pre-Packing Fresh Meat."

FIELD OF THE INVENTION

This invention relates to the centralized prepacking of fresh meats at the meat packing plant prior to shipment to the point of storage or retail sale. More particularly, the invention relates to a process for prepacking fresh pork so that the pork can be maintained in an attractive condition and of acceptable and uniform quality for an extended period.

BRIEF DESCRIPTION OF THE PRIOR ART

In order to control bacterial spoilage in meat, it has been proposed to use a relatively high or enhanced level of carbon dioxide to preserve the meat as it is containerized by the packer, and for the purpose of minimizing microbial growth and extending the shelf life of the meat. However, the depletion of oxygen, and the presence of a high concentration of carbon dioxide accelerates the loss of the desirable red color in the meat, and the progression of bone discoloration, and these factors reduce the shelf life which characterize meat prepacked in this way.

In some systems, particularly in European markets, the gaseous environment used in packing fresh meat cuts has included a high level of oxygen in order to maintain the red coloration of the meat indicative of freshness. A high level of oxygen, however, accelerates oxidative rancidity reactions which cause the development of both an undesirable odor in the meat, and an undesirable oxidative flavor.

I have now determined that the optimization of fresh meat prepacking systems can only be realized where the concurrently confronted problems of bacterial spoilage, meat discoloration, bone discoloration, oxidative rancidity and variation in the pH of the meat are resolved, or at least satisfactorily alleviated.

U.S. Pat. No. 3,154,421 discloses that the desirable bright red fresh meat color can be enhanced and maintained for about a one week period in the case of fresh meat packaged in air (about 21 percent $O_2$) by treating the meat with a mixture of phosphate salts, ascorbic acid, or alkali metal salts, and a sequestering agent, such as citric acid. This patent does not suggest how the shelf life of the fresh meat might be yet further extended, nor does it provide any indication of the effect which would be realized if meat treated with the described chemicals were packed in a controlled, modified gaseous atmosphere containing a substantial amount of carbon dioxide as compared to air. The patentees state that "the natural pH" of the meat is about 6.2.

BRIEF DESCRIPTION OF THE PRESENT INVENTION

The present invention is a method for the centralized prepacking of fresh cuts of pork which have an excellent extended shelf life and are suitable for display at the point of retail sale in consumer sized packages. I have determined that there is a wide and unpredictable variation in the pH which characterizes fresh pork loins derived, at random, from freshly slaughtered hogs. Pork loins also vary considerably in the flavor and other organoleptic properties exhibited by the loins after extended periods of storage at near freezing temperatures. The unpredictability of these various properties, and the pH variation which exists, influencing as it does, the reaction of the meat to packaging conditions over extended periods of time, results in a lack of consistency of quality which is discouraging to consumer selection and purchase. In other words, fresh cuts, such as pork chops, though originated at the same time from the same packer, display and exhibit at the time of sale, very substantial differences in appearance, taste, odor and exuded purge or other properites from one chop to the next—or at least from one package to the next.

I have further determined that the pH value of fresh meat is related to the extent to which the meat retains the bright red color associated with freshness, and which is a highly desirable characteristic from the standpoint of consumer acceptance. Thus, I have found that pork chops having a pH which is lower than about 5.7 tend to become discolored by turning a dull and unsightly brown after from seven to fourteen days in the package and during storage. The chops having a pH higher than about 5.7 on the other hand, retain the bright red color indicative of freshness much better. This fresh meat color difference is substantially more pronounced where the chops are packaged in a modified atmosphere which contains significantly more carbon dioxide that is present in air. A controlled gaseous atmosphere of this type is desirable for packaging fresh pork, because the enhanced level of carbon dioxide suppresses microbial activity which causes spoilage of the meat. This controlled or modified atmosphere packing thus extends the effective microbial shelf life of the meat over that attainable when the meat is packed in air and high oxygen atmospheres.

Although I have observed and confirmed the described variation in color level and stability to be associated with differences in the pH of various cuts of fresh pork, it is quite burdensome economically to undertake to test all freshly slaughtered animals, or the cuts derived therefrom, to determine pH before undertaking to package only the relatively high pH cuts so that the consumer can expect consistently excellent color and quality in all such cuts.

It is against the background of the described observations of the effect of pH, and the wide variation in the organoleptic and other properties of fresh meat, that the present invention has evolved. The present invention permits fresh meat of consistent high quality and extended shelf life to be economically prepackaged at a central location without the necessity of a cut-by-cut or animal-by-animal analysis of pH and other properties before commencing the packing procedure.

Broadly described, the packing method of the invention comprises initially treating fresh cuts of pork with an aqueous solution which effectively maintains the red coloration of the meat for a period well exceeding 14 days by retaining the heme iron in a reduced (ferrous) state, and retarding or precluding oxidation reactions by both a reducing activity and a sequestering action by which oxidation-promoting metallic ions are sequestered or chemically bound. A treating solution employed for this purpose is a three-component aqueous solution which includes (a) an alkali metal salt of one or more of certain phosphate compounds, (b) a reducing compound selected from the group consisting of ascorbic acid, isoascorbic acid, the alkali metal salts of these acids, and reductic acid, and finally, (c) a sequestering or chelating agent, such as citric acid, tartaric acid, or the alkali metal salts thereof.

Several methods of application of the buffer solution to the fresh cuts of pork can be utilized, including pumping, marinating and spraying. In general, a sufficient amount of the aqueous buffer solution is placed on and into the meat that the treated product will contain the active components in concentrations such that from about 0.1 weight percent to about 2.0 weight percent of the phosphate compound is included, from about 0.01 weight percent to about 0.10 weight percent of the reducing compound is included, and from about 0.01 weight percent to about 0.20 weight percent of the sequestering or chelating agent is included.

After the fresh pork cuts have been treated with the buffer solution, they are placed in a package which can be sealed to be relatively gas tight. Incorporated within the package and over the meat cuts is a gaseous atmosphere which contains from about 20 to about 80 percent of carbon dioxide and from about 2 to about 30 percent of oxygen. The remaining gas present consists essentially of nitrogen. The specified concentrations of gases are bases upon mole percent of the gas present in the mixture.

Finally, the packaged meat is preferably stored and transported at a temperature $34°\pm2°$ F., and is displayed and sold at retail at a typical meat case temperature of $38°\pm2°$ F.

An important object of the invention is to provide a process for treating and packing fresh meat so that the meat will remain in an attractive, substantially odor-free and palatable condition over an extended shelf life after the meat has been packed according to the method of the invention, and shipped from the meat packer to its destination.

A further object of the invention is to stabilize the pH of fresh pork cuts at a pH value which is optimum for packing, shipment and display at the point of retail sale, and for the purpose of preventing loss of the attractive red or pink fresh meat coloration.

Yet a further object of the present invention is to provide a process for treating and packing fresh pork cuts so that the meat is maintained in an attractive, unspoiled condition over an extended period of time.

Another object of the invention is to provide a method of prepacking fresh pork cuts which eliminates the necessity for repackaging or handling or processing of any type by a retailer after receiving the packaged pork from the meat packer.

Another object of the invention is to process fresh pork so that it can be shipped and stored to consistently exhibit at least 20 days shelf life with retention of good quality and good color over at least this period of time when packaged in a selected controlled atmosphere which is relatively high in $CO_2$.

An additional object of the present invention is to provide a new method for packaging fresh cuts of pork, such as pork chops, so that the meat does not become discolored, and the microbial activity in the meat cuts is maintained at acceptable levels over extended time periods adequate to facilitate display and sale of the meat to the consumer without further treatment or alteration of the packaging.

Another object of the invention is to stabilize and homogenize certain consumer sensitive characteristics of fresh pork, so that fresh pork cuts having inherently variable properties can be made, by a single treatment and procedure, to display uniform, highly desirable properties over extended shelf life periods.

A further object of the invention is to extend the color shelf-life of relatively low pH pork cuts to an extent such that the cuts retain an excellent fresh color for a time period substantially equivalent to the best attainable microbiological shelf-life.

Yet a further object of the invention is to enhance the organoleptic properties of fresh pork.

Another object of the invention is to eliminate the necessity for pretesting fresh pork cuts for pH in order to know which of such cuts can be prepacked and successfully sold at retail outlets more than about fourteen days after such prepacking.

A further and more specific object is to reduce the percent of purge exuded from fresh pork cuts over extended storage times.

Another relatively specific object of the invention is to retard the progression in fresh pork meat of oxidative rancidity causing off-odor.

Additional objects and advantages will become apparent as the following detailed description of a preferred embodiment of the invention is read in conjunction with the accompanying drawings which illustrate a preferred embodiment of package developed in the course of practicing the process of the present invention, and which also graphically portray the results of certain tests which were performed to confirm the efficacy of the invention.

DETAILED DESCRIPTION OF A PREFERRED EMBODIMENT OF THE INVENTION

The process of the present invention broadly includes two aspects. First, the fresh pork—generally cuts such as pork loins or pork chops—is treated with a aqueous buffer solution so as to incorporate certain active chemicals. This pretreatment then aids in the maintenance of desirable color, the prevention of undesirable oxidative reactions, the enhancement of organoleptic properties and the overall preservation of the meat over an extended period of time when the pretreated meat is stored or packed in a certain controlled gaseous atmosphere.

After treatment with the aqueous buffer solution, the second major phase of the process of the invention involves packing the treated pork cuts in a controlled gaseous atmosphere which contains oxygen and a substantial amount of carbon dioxide. This gaseous mixture, which contains substantially more carbon dioxide than is found naturally in air, has been found to substantially retard bacterial spoilage, and thus substantially extend the microbial shelf life of the meat.

The aqueous solution used in the initial step in the process of the invention includes three active constituents. The first of these is a phosphate compound selected from the group consisting of alkali metal orthophosphates, pyrophosphates, tripolyphosphates and hexametaphosphates. Phosphate compounds in which the cation is sodium or potassium are preferred. The amount of the phosphate compound employed, based on the total weight of the pork cut after treatment, is from about 0.1 to about 2.0 weight percent, and is preferably from about 0.2 to about 0.5 weight percent. The concentration of the phosphate compound in the aqueous solution will vary according to the manner in which the buffer solution is applied to the meat. Thus, for example, and as will be hereinafter explained in greater detail, where the buffer solution is applied to the meat by injection or pumping, a relatively larger amount of the aqueous buffer solution remains in the meat than is incorporated therein when a marinating process is used. For this reason, the concentration of the active ingredients, including the phosphate compounds, can be relatively lower in the aqueous buffer solution so pumped or injected.

The second active ingredient in the aqueous buffer solution is a reducing agent or compound. The preferred compounds having reducing activity and which are acceptable as a food additive are ascorbic acid and isoascorbic acid, and the alkali metal salts of these acids. The potassium and sodium salts are preferred. Reductic acid can also be utilized. The reducing agents used in the aqueous buffer solution function to retain the heme iron in the meat pigment in the ferrous state. The meat therefore tends to retain its red color, and to have a fresh appearance over an extended time period. The reducing agent also functions to retard or inhibit oxidative reactions resulting in rancidity, and in the production of malodorous reaction products.

The amount of reducing compound employed can vary over a wide range, but in the case of the preferred ascorbic acid, isoascorbic acid and the alkali metal salts of these acids, it is preferred that a concentration of from about 0.01 to about 0.1 weight percent be incorporated in the meat. The most preferred amount of the reducing agent utilized is from about 0.02 weight percent to about 0.05 weight percent.

The third active component of the aqueous buffer solution is a sequestering or chelating agent which is a compound capable of tying up or bonding certain metal ions present in low concentrations in the meat, and which functions as undesirable prooxidants. Typical of such metal ions are iron, zinc and copper. Several effective sequestering agents are known to chelate or form complexes with these metal ions. Those which are preferred in the case of the present invention are, however, citric acid, tartaric acid, ethylenediaminetetracetic acid, and the sodium and potassium salts thereof. The quantitative amount of the sequestering agent which is incorporated in the treated meat is from about 0.01 to about 0.2 weight percent. The amount of the sequestering agent which is preferably utilized is from about 0.01 weight percent to about 0.05 weight percent based, of course, on the total weight of treated meat. Citric acid is the preferred sequestering compound.

In treating fresh pork cuts with the described three-component treating solution, the treatment of the meat cut can be effected in several ways. Larger cuts or primal cuts, such as pork loins, are treated by pumping or injecting the meat with the buffer solution.

If the primal cuts are to be further subdivided to produce pork chops or smaller cuts, the primal cuts need not be treated and these secondary cuts are preferably marinated in the buffer solution. The pork chops can, alternatively, be sprayed with the buffer solution.

The described treatment with the three-component aqueous buffer solution can be especially beneficially employed for treating fresh pork cuts having a pH of between about 5.2 and about 5.7 because in the case of these relatively low pH cuts, I have determined that without such treatment they will become discolored relatively soon in an enhanced $CO_2$ environment. Cuts which have a pH above about 5.7, on the other hand, appear to retain their fresh meat color over an extended period of time which is substantially coextensive with the microbiological shelf life of extended duration achieved by packing the meat in an enhanced carbon dioxide gaseous environment.

Despite this marked difference in the relationship of the various color-determining pigments to the parameters of pH and the particular gaseous environment in which the meat cuts are packed, I have determined that pretreatment of the meat carried out in accordance with the present invention makes it unnecessary to engage in expensive, time consuming pretesting to identify cuts which, by reason of a characteristically low pH, are unsatisfactory for extended storage followed by retail sale display.

I have further determined that such pretreatment is especially valuable and advantageous because of the unexpectedly wide and unpredictable variations in the pH of fresh pork cuts taken from animals raised under similar circumstances and in the same environment. Such pH variation is strikingly shown by the results of a series of pH measurement tests conducted at plant level on freshly cut pork loins over a period of about two months. The results of these tests to determine the pH of fresh loins showed, as tabulated in Table I, that the amount of the tested loins having a pH greater than about 5.7 (below which fresh meat color stability cannot be expected) varied unpredictably from 22.2 percent of the loins of animals slaughtered and tested on one day, up to about 98.1 percent of the loins derived from animals slaughtered and tested about four days later.

TABLE I

| Test Date | Total Loins Sampled | Total Loins Having pH Greater than 5.7 | Percent Loins Having pH Greater Than 5.7 |
|---|---|---|---|
| 7/03/85 | 100 | 42 | 42.0 |
| 7/16/85 | 100 | 24 | 24.0 |
| 7/17/85 | 100 | 45 | 45.0 |
| 7/18/85 | 100 | 72 | 72.0 |
| 7/22/85 | 100 | 68 | 68.0 |
| 7/23/85 | 100 | 69 | 69.0 |
| 7/24/85 | 270 | 140 | 51.9 |
| 7/25/85 | 210 | 95 | 45.2 |
| 7/26/85 | 100 | 33 | 33.0 |
| 8/13/85 | 100 | 61 | 61.0 |
| 8/23/85 | 152 | 72 | 47.3 |
| 8/23/85 | 135 | 30 | 22.2 |
| 8/23/85 | 140 | 58 | 41.4 |
| 8/23/85 | 140 | 58 | 41.4 |
| 8/27/85 | 52 | 51 | 98.1 |
| 8/27/85 | 65 | 58 | 89.2 |
| 9/04/85 | 100 | 26 | 26.0 |
| 9/09/85 | 100 | 51 | 51.0 |
| 9/13/85 | 100 | 37 | 37.0 |

As will be hereinafter shown, pretreatment with the aqueous buffer solution of the present invention effectively extends the color shelf life of the low pH loins and chops. Such pretreatment also enhances and renders substantially consistent with such parameters observed in the higher pH chops, other consumer sensitive parameters, such as the organoleptic properties of the meat (taste, odor, etc.). It also usually reduces the purge from both the relatively high pH chops and the relatively low pH chops.

An important significance and value of this determination is that by the use of the buffer solution pretreatment, it becomes unnecessary to pretest each pork loin or pork chop in order to be certain that, regardless of the type of gaseous atmosphere in which the chop is packaged, it will not develop an unacceptable color in a short time as a result of having a relatively low pH. All of the freshly slaughtered animals, or the cuts derived therefrom, can be treated with the buffer solution prior to prepackaging in the controlled atmosphere, and our experimentation and results indicate that when such treatment is carried out, the treated chops stored in an enhanced carbon dioxide gaseous atmosphere will have a color and microbiological shelf life exceeding twenty-one days. Moreover, all of the organoleptic properties are enhanced and rendered substantially consistent, as compared to fresh meat cuts which have not undergone such pretreatment.

When the preferred active ingredients of the buffer solution are employed, and are used in the ranges described, the aqueous buffer solution utilized will have a pH of from about 5.0 to about 8.0. Where the treating solution requires a slight elevation in pH to bring it into the described range, a very small amount of sodium carbonate or sodium bicarbonate can be used for this purpose, although such is generally not needed. Preferably, the aqueous treating solution is made up to have a pH of between 6.0 and 7.0. This solution of this preferred pH will generally be effective to slightly elevate the pH of cuts to which the buffer solution is applied because these cuts generally have a natural pH lower than about 6.0 and higher than about 5.2.

The cuts which have been treated with the aqueous buffer solution are next packed in a gaseous environment which has been optimized to include a sufficient amount of carbon dioxide to provide an effective bacteriostatic effect on aerobic psychrotrophic bacteria, and which also contains a sufficient amount of oxygen to form oxymyoglobin in the meat. This latter effect acts in conjunction with the color enhancing effect of the aqueous treating solution to maintain the fresh red color of the meat over an extended period of time. The gaseous environment used to meet the described objectives contains from about 20 to about 80 percent carbon dioxide and from about 2 to about 30 percent oxygen. The balance consists essentially of nitrogen.

The amount of carbon dioxide which is preferably present in the gaseous mixture used in packing the treated cuts is from about 30 percent to about 60 percent, with about 50 percent being optimum. The amount of oxygen in the gaseous mixture is most suitably from about 10 percent to about 25 percent, with about 15 percent being the most preferred oxygen concentration. The composition of the gaseous atmosphere in the package will gradually change with passing time in storage or shipment as the gases are absorbed by the meat. Typically, the amount of nitrogen in the gaseous mixture will increase, and the carbon dioxide content will decrease.

Various types of packaging can be employed, but I prefer to employ a compound package of the type described in co-pending U.S. patent application Ser. No. 740,571, assigned to the assignee of the present application. The geometric and physical characteristics of such compound package, including the styrofoam tray of the primary package and the thermoformed secondary package, are incorporated in the present application by reference.

Figure 1:
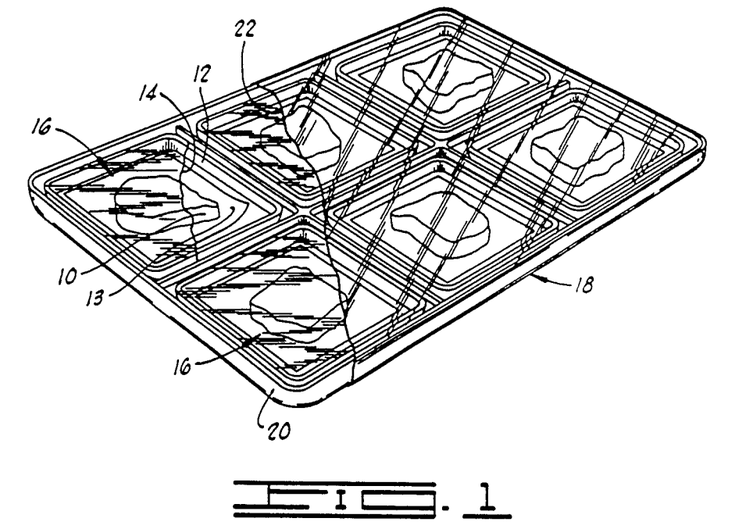
FIG. 1 is a perspective view showing a compound package useful in practicing the process of the present invention.

Cuts which have been treated with the described aqueous buffer solution in the way discussed are illustrated and denominated by reference numeral 10 in FIG. 1 of the accompanying drawings. These treated cuts 10 are placed on styrofoam trays 12, each of which carries a soaker pad 13 in the bottom for absorbing exudate and juices from the meat cuts. Each styrofoam tray 12 is then passed into an environment where a selected gaseous atmosphere is provided around the meat cut as the styrofoam tray is closed with a gas permeable film of synthetic resin. The gaseous atmosphere around the meat and over the styrofoam tray 12 at this point in the process preferably contains oxygen and carbon dioxide in the concentrations hereinbefore described.

After formation of the primary package using the procedure described in the cited co-pending application, several of the small primary packages 16 which, as there explained, are preferably of case-ready configuration and size, are positioned in a larger container to form a compound secondary package 18. A number of the styrofoam trays 12 are placed on a larger, thermoformed secondary tray 20. The secondary tray 20 is then subjected to a sealing process in which a gas impermeable film 22 of synthetic resin is used for enclosing all of the smaller primary packages 16. In the course of sealing the secondary tray 20, the air is initially evacuated from this compound package, and is then replaced with a gaseous mixture which contains oxygen and carbon dioxide in the previously described concentrations. In evacuating air from the secondary tray, a vacuum in excess of about 15 inches of mercury is avoided so that the gas permeable films of the primary packages 16 will not burst or excessively wrinkle. As a result of the placement of the described gaseous mixture within the gas impermeable sealing film 22 of the secondary tray 20, the pressure over the primary packages is returned to approximately atmospheric pressure.

Upon completion of the packing, the packages are preferably maintained at a temperature of 34°±2° F. during storage and transportation. Maintenance of this temperature greatly assists in the extension of the shelf life without microbial spoilage. After arrival at the point of retail sale, the small primary packages are removed and are displayed at about 38° F.

The treatment of the meat cuts with the aqueous buffer solution, followed by packing them in packages in which the described amounts of carbon dioxide and oxygen are included, yields several advantages not attained in prior art packing methods. First, the bacteriostatic effect of the carbon dioxide controls the growth of psychrotropic aerobes—meat spoilage bacteria. The presence of at least 2 percent oxygen and of the reducing compound in the buffer solution maintains the red color of the meat so that the meat has a fresh appearance. Without this oxygen content, the high level of carbon dioxide present would cause the development of a brown-grayish color in the meat and severe bone discoloration in a relatively short time, making the meat unattractive to the consumer. Further, the development of undesirable oxidative off-flavor resulting from oxidative rancidity in the meat is retarded by the reducing and sequestering substances in the buffer solution.

Another advantage of the process of the present invention is that the pH of the meat cuts can be adjusted to at least as high as about 5.7 by the use of the buffer solution, and the adverse affect of a high level of carbon dioxide on the color of relatively low pH meat can be minimized through pH elevation upon treatment with the buffer solution. In other words, the quality of pork chops or other cuts of low pH (pH 5.6 or lower), which cuts constitute a large portion of the total production (see Table I), can be upgraded, and the quality consistency of the product over extended periods of time can be assured. As pointed out above, it is not economically practical to pH test every one of the fresh cuts, but it is neither difficult, time consuming, nor expensive to pretreat all of them with the buffering solution of the present invention in order to overcome color loss upon packing the chops in a controlled atmosphere. Moreover, the application of the treating solution to even the relatively high (greater than pH about 5.7) pH chops improves the organoleptic properties of these chops and reduces purge loss.

Without the described buffer solution treatment, discoloration of the meat and bone become limiting factors in the shelf life of pork chops stored in an atmosphere characterized by a sufficiently high level of carbon dioxide to prevent bacterial spoilage. The ability to maintain the color of the meat, despite the presence of a substantial amount of carbon dioxide, is due both to the inclusion in the buffer solution of reducing agents which retain the heme iron in the meat pigment in the ferrous state, and to the presence of at least 2 percent oxygen in the gaseous atmosphere in which the meat is packed.

EXAMPLE 1

A number of tests were carried out to determine the effect of treating pork chops with the aqueous buffer solution, followed by packing the chops in several types of gaseous environments, followed by storing the chops for extended periods of time at 34° F. Each of the chop samples used in the tests was about one-half inch thick, and was cut to weigh about one-quarter pound by removal of most of the fat so that the chop was close trimmed. Periodically during the storage, the chops were examined to evaluate the pH of the chops, the progression of meat discoloration, the progression of bone discoloration and the overall appearance. The chops were also periodically examined for the development of oxidative rancidity (TBA) and for off-odor.

In these tests, 22 pork chops were cut from a first pork loin and 20 pork chops from a second pork loin. The chops from each loin were then divided into groups which would represent storage period time increments at which observations of the chops in the group would be made. The pork chops in each of the groups were chops cut from the parent loin at substantially the same locations. The chops in each group were, for purposes of reporting the test results, identified and tabulated in the test results as Chops 1, 2, 3, and 4.

In each group of chops, the chops denominated No. 1 and No. 3 were the control samples, and were not subjected to buffer solution treatment. The No. 2 and No. 4 pork chops in each of the groups were marinated in the buffer solution for thirty seconds. The aqueous buffer solution utilized for treating the No. 2 and No. 4 pork chops contained about 10.3 weight percent tetrasodium pyrophosphate, about 1.72 weight percent of sodium erythorbate and about 3.4 weight percent of citric acid. The marination treatment resulted in an average increase in the weight of the chops of about 3 percent.

The No. 1 and No. 2 chops in each group, constituting, as described above, one control sample and one chop treated with the described buffer solution, were each placed in a package in a gaseous atmosphere which contained 40 percent carbon dioxide, 25 percent oxygen and 35 percent nitrogen. Chop Nos. 3 and 4 in each group were each placed in a package which contained 40 percent carbon dioxide, substantially no oxygen and 60 percent nitrogen. These two gaseous atmospheres used for packing the several samples are shown in Table II.

TABLE II

| Gaseous Atmosphere in the Test Packages, Percent | | |
|---|---|---|
| | Chop Samples No. 1 & No. 2 | Chop Samples No. 3 & No. 4 |
| $CO_2$ | 40.0 | 40.0 |
| $O_2$ | 25.0 | 0.0 |
| $N_2$ | 35.0 | 60.0 |

Table III shows the manner in which the gaseous atmosphere changed in its composition after the packages had been stored at 34° F. for a period of 34 days, during which time the chops were periodically tested.

TABLE III

| Gaseous Composition in the Test Packages After Storage at 34° F., Percent | | |
|---|---|---|
| | Chop Samples No. 1 & No. 2 | Chop Samples No. 3 & No. 4 |
| $CO_2$ | 26.0 | 24.0 |
| $O_2$ | 27.0 | 2.0 |
| $N_2$ | 47.0 | 74.0 |

At approximately weekly time intervals, the pork chops in the several sets were tested for meat discoloration, bone discoloration and overall appearance. The results of these tests are set forth in Tables IV, V and VI, respectively.

TABLE IV

Meat Discoloration*

| | Loin No. 1 Samples | | | | Loin No. 2 Samples | | | |
|---|---|---|---|---|---|---|---|---|
| Days at 34° F. | Chop No. 1 | Chop No. 2 | Chop No. 3 | Chop No. 4 | Chop No. 1 | Chop No. 2 | Chop No. 3 | Chop No. 4 |
| 1 | 7 | 7 | — | — | — | — | — | — |
| 6 | 5 | 6 | 1 | 2 | 6 | 6 | 3 | 6 |
| 13 | 5 | 6 | 1 | 2 | 4 | 5 | 1 | 4 |
| 20 | 4 | 5 | 1 | 2 | 4 | 6 | 1 | 2 |
| 27 | 2 | 4 | 1 | 1 | 3 | 5 | 1 | 1 |
| 34 | 2 | 4 | 1 | 1 | 2 | 4 | 1 | 1 |

*(7) No surface discoloration
(6) Trace discoloration
(5) Slight discoloration
(4) Moderate discoloration
(3) ¼ discoloration
(2) ½ discoloration
(1) Total surface discoloration

TABLE V

Bone Discoloration**

| | Loin No. 1 Samples | | | | Loin No. 2 Samples | | | |
|---|---|---|---|---|---|---|---|---|
| Days at 34° F. | Chop No. 1 | Chop No. 2 | Chop No. 3 | Chop No. 4 | Chop No. 1 | Chop No. 2 | Chop No. 3 | Chop No. 4 |
| 1 | — | — | — | — | — | — | — | — |
| 6 | ++ | — | ++ | — | ++ | — | ++ | — |
| 13 | +++ | — | +++ | — | +++ | — | +++ | — |
| 20 | +++ | — | +++ | — | +++ | — | +++ | — |
| 27 | +++ | ++ | +++ | — | +++ | — | +++ | — |
| 34 | +++ | ++ | +++ | +++ | +++ | ++ | +++ | +++ |

**None —
Slight +
Moderate ++
Total +++

TABLE VI

Overall Appearance***

| | Loin No. 1 Samples | | | | Loin No. 2 Samples | | | |
|---|---|---|---|---|---|---|---|---|
| Days at 34° F. | Chop No. 1 | Chop No. 2 | Chop No. 3 | Chop No. 4 | Chop No. 1 | Chop No. 2 | Chop No. 3 | Chop No. 4 |
| 1 | 6 | 7 | — | — | — | — | — | — |
| 6 | 4 | 6 | 1 | 3 | 4 | 6 | 3 | 6 |
| 13 | 3 | 6 | 1 | 3 | 3 | 6 | 1 | 4 |
| 20 | 3 | 5 | 1 | 2 | 3 | 6 | 1 | 2 |
| 27 | 2 | 4 | 1 | 1 | 3 | 5 | 1 | 1 |
| 34 | 1 | 3 | 1 | 1 | 2 | 4 | 1 | 1 |

***(7) Extremely desirable
(6) Moderately desirable
(5) Desirable
(4) Slightly undesirable
(3) Moderately undesirable
(2) Undesirable
(1) Extremely undesirable The test results set forth in Table IV show that Chops No. 1 and No. 2, which were packaged in a gaseous mixture containing about 25 percent oxygen and about 40 percent carbon dioxide, showed only slight meat discoloration after 13 days of storage. The No. 2 chops which had been treated with the buffer solution, retained their fresh color longer than did No. 1 chops, and even after the 27th day showed only moderate discoloration. By this time, about one-half of each No. 1 chop had become discolored.

The tests further showed that marination in the buffer solution of the No. 4 pork chops from Loin Sample No. 1 did little to retard discoloration in the meat where the gaseous atmosphere into which these chops were placed contained the same 40 percent level of carbon dioxide as in the case of the No. 1 and No. 2, pork chops, but contained negligible oxygen. In the case of the No. 3 and 4 pork chops derived from Loin Sample No. 2, the No. 4 chops which had been pretreated with a buffering solution did become discolored more slowly, even when stored in the oxygen-free gaseous atmosphere. This appears to demonstrate that treatment with the buffer solution, while functioning far less than optimally unless coupled with the use of the described preferred gaseous mixture, nevertheless does have some affect in retarding meat discoloration in the presence of a high concentration of carbon dioxide with very little oxygen present. Table IV clearly shows, nevertheless, that a more advantageous mode of processing entails pretreatment with the buffer solution, followed by packing of the chops in a package which contains significant oxygen. This is confirmed by the results obtained in testing the No. 2 pork chops from both of the pork loins. These chops were pretreated with the buffer solution as described, then packed in the oxygen and carbon dioxide-containing atmosphere.

Table V shows the result of examining bone discoloration in pork chops treated and packed in the same way as the chops referred to in Table IV, where the meat discoloration results are reported in tabular form. It will be noted that in the case of the No. 2 and No. 4 chops, which were marinated in the buffer solution before packing, bone discoloration was negligible for a period of 20 days, and that even after 27 days, bone discoloration was not significant in the case of these pretreated chops from each of the two loin samples. By contrast, the bones of the No. 1 and No. 3 chops from each of the two loin samples became, in each case, totally discolored after only 13 days. The bone color desideratum does not appear to be as adversely affected by packing in a gaseous atmosphere which is very low in oxygen as does the meat color desideratum.

Table VI undertakes to evaluate the overall appearance of the chops from each of the two loins upon periodic observations. Again, the importance of the presence of a small amount of oxygen in the gaseous mixture in which the chops are packed is apparent from tabulated results. The No. 1 and No. 2 chops from each of the loins are unquestionably of better appearance over extended periods of time, and at virtually all test intervals, than the No. 3 and No. 4 chops which were packed in an oxygen-free gaseous environment. The test results further demonstrate the importance of premarination with the aqueous buffer solution, because in every instance of equivalent gaseous atmospheres used in packing of the chops, those chops which were premarinated show a better overall appearance than those not receiving this treatment. The best results occurred in the case of the No. 2 chops from each of the loin samples, and these buffer solution-treated chops, packed in an oxygen-$CO_2$ gaseous atmosphere, continued to have a desirable appearance for at least 20 days.

At the intervals of observation and measurement described, the several pork chops derived from the two loins were also tested to determine the surface pH of the cuts. These results are tabulated in Table VII.

TABLE VII

| | Meat Surface pH | | | | | | | |
|---|---|---|---|---|---|---|---|---|
| | Loin No. 1 Samples | | | | Loin No. 2 Samples | | | |
| Days at 34° F. | Chop No. 1 | Chop No. 2 | Chop No. 3 | Chop No. 4 | Chop No. 1 | Chop No. 2 | Chop No. 3 | Chop No. 4 |
| 1 | 5.31 | 5.46 | — | — | — | — | — | — |
| 6 | 5.42 | 5.59 | 5.45 | 5.60 | 5.42 | 5.60 | 5.42 | 5.61 |
| 13 | 5.50 | 5.68 | 5.51 | 5.64 | 5.47 | 5.64 | 5.48 | 5.68 |
| 20 | 5.49 | 5.69 | 5.52 | 5.72 | 5.48 | 5.67 | 5.49 | 5.66 |
| 27 | 5.54 | 5.71 | 5.54 | 5.68 | 5.47 | 5.66 | 5.50 | 5.72 |
| 34 | 5.46 | 5.65 | 5.38 | 5.54 | 5.36 | 5.53 | 5.36 | 5.51 |

It will be perceived from the results in Table VII that treatment with the buffer solution is generally effective to elevate the pH of chops taken from adjacent locations in the respective loins by a pH increment of about 0.15. It is further apparent by correlating the pH values of the several chops after the test periods of storage at 34° F. that those chops which have a pH of over 5.6 generally retain a desirable color of both the meat and bone for a longer period of time.

In Table VIII, TBA (oxidative rancidity) values for the chops are tabulated as determined at the periodic times of testing and observation. In determining the TBA value of a meat cut, an extract from the cut is treated with a standard mixture of 2-barbituric acid and glacial acetic acid to develop a color. This color is an indicator of the rancidity level in the meat. In general, a TBA value above about 1.5 is indicative of the onset of rancidity, and an undesirable odor can be detected.

TABLE VIII

| | TBA Oxidative Rancidity Values | | | | | | | |
|---|---|---|---|---|---|---|---|---|
| | Loin No. 1 Samples | | | | Loin No. 2 Samples | | | |
| Days at 34° F. | Chop No. 1 | Chop No. 2 | Chop No. 3 | Chop No. 4 | Chop No. 1 | Chop No. 2 | Chop No. 3 | Chop No. 4 |
| 1 | 0.19 | 0.16 | — | — | — | — | — | — |
| 6 | 0.22 | 0.13 | 0.17 | 0.11 | 0.19 | 0.10 | 0.23 | 0.13 |
| 13 | 0.30 | 0.23 | 0.31 | 0.22 | 0.31 | 0.22 | 0.39 | 0.33 |
| 20 | 1.70 | 0.45 | 1.10 | 0.27 | 0.53 | 0.33 | 0.52 | 0.36 |
| 27 | 4.40 | 0.64 | 1.80 | 0.41 | 1.20 | 0.38 | 0.47 | 0.30 |
| 34 | 8.60 | 1.40 | 2.70 | 0.56 | 0.81 | 0.28 | 0.58 | 0.30 |

The values set forth in Table VIII clearly show the advantage of treating the chops with the aqueous buffer solution to control the development of oxidative rancidity in the meats, regardless of whether the atmosphere in which the chops are packaged is high in oxygen. This is shown by the advantage in this respect of the No. 2 and No. 4 chops over the control chops (Chops No. 1 and No. 3).

Table IX reports the results of odor tests carried out at the periodic testing times utilized in the examination of the other test parameters previously described. An off-odor indicative of rancidity was at least moderately detectable in the case of all of the tested chops after 27 days in storage at 34° F. The chops which had been marinated in the buffer solution, however, had, at worst, only a slightly detectable odor after 20 days in storage.

TABLE IX

| | Off-Odor* | | | | | | | |
|---|---|---|---|---|---|---|---|---|
| | Loin No. 1 Samples | | | | Loin No. 2 Samples | | | |
| Days at 34° F. | Chop No. 1 | Chop No. 2 | Chop No. 3 | Chop No. 4 | Chop No. 1 | Chop No. 2 | Chop No. 3 | Chop No. 4 |
| 1 | 4 | 4 | — | — | — | — | — | — |

TABLE IX-continued

| | Off-Odor* | | | | | | | |
|---|---|---|---|---|---|---|---|---|
| | Loin No. 1 Samples | | | | Loin No. 2 Samples | | | |
| Days at 34° F. | Chop No. 1 | Chop No. 2 | Chop No. 3 | Chop No. 4 | Chop No. 1 | Chop No. 2 | Chop No. 3 | Chop No. 4 |
| 6 | 4 | 4 | 3 | 3 | 4 | 4 | 4 | 4 |
| 13 | 3 | 3 | 2 | 2 | 4 | 4 | 4 | 4 |
| 20 | 2 | 3 | 2 | 3 | 3 | 4 | 4 | 4 |
| 27 | 1 | 2 | 1 | 1 | 2 | 2 | 2 | 2 |
| 34 | 1 | 1 | 1 | 1 | 1 | 2 | 1 | 1 |

*(4) No detectable off-odor
(3) Slightly detectable
(2) Moderately detectable
(1) Very strong off-odor The described test results clearly show that significant improvements in the appearance and in the shelf life quality of fresh pork cuts is attainable through practice of the present invention. The highly effective procedure involves the coupling of the buffer solution pretreatment with packing of the treated meat cuts in a gaseous environment which contains both oxygen and at least 20 percent carbon dioxide.

EXAMPLE 2

Tests were carried out to determine the effect on meat color of various prepackaging treatments of groups of pork chops having a pH of about 5.5, and other groups of chops having a pH of about 5.8. In all these tests, the chops were packaged in an atmosphere containing 50 percent $CO_2$, 11 percent $O_2$ and the balance consisting essentially of $N_2$. The control chops were not treated prior to packing, but in the case of the other chops, various types of aqueous solutions were used to pretreat the chops before packing in the controlled gaseous atmosphere. The treatments employed are shown in the footnotes to Table X where the results of these tests are tabulated.

Both the treated and control chops were stored at 34° F. in packages containing the described controlled atmosphere. After storage of the chops for the number of days specified in the first column of Table X, the packages were then opened and the chops displayed in a meat case at 38° F. for the number of display days shown in the Table. While so displayed, the chops were periodically observed to determine the number which had become unacceptably discolored. The number of such unacceptably discolored chops is shown in Table X under the columns which are headed "Days in Display at 38° F.".

From the results entered in Table X, it will be perceived that Treatments 2 and 3, utilizing the buffer solution of the present invention, whether the solution is applied to the pork chops by pumping or by spraying, reduces the number of chops becoming unacceptably discolored after the period in storage at 34° F., followed by display at 38° F. The results obtained were especially good when the chops were pumped (injected) with the buffer solution. The tabulated data also shows that the use of the three component buffer solution for pretreating the chops yielded substantially better results, in terms of unacceptable discoloration, then did pumping the chops with an aqueous phosphate solution containing only the phosphate salt. Finally, the data in Table X shows that, although all chops not pretreated and stored in the controlled atmosphere developed some unacceptable discoloration, the extent of such discoloration is much greater in the case of the low pH chops than in the case of chops having a pH of around 5.8.

TABLE X

| | | Number of Unacceptably Discolored Chops | | | | | | | | |
|---|---|---|---|---|---|---|---|---|---|---|
| Days in | | Low pH Loin (pH about 5.5) | | | | | High pH Loin (pH about 5.8) | | | |
| Controlled | | | Days in Display at 38° F. | | | | | Days in Display at 38° F. | | |
| Atmosphere | Treat- | Total No. | | | | | Total No. | | | | |
| (34° F.) | ment* | of Chops | 0 | 1 | 2 | 3 | of Chops | 0 | 1 | 2 | 3 |
| 5 | 1 | 24 | 0 | — | 0 | 2 | 24 | 0 | — | 0 | 0 |
|   | 2 | 24 | 0 | — | 0 | 0 | 24 | 0 | — | 0 | 0 |
|   | 3 | 24 | 1 | — | 1 | 1 | 24 | 0 | — | 0 | 0 |
|   | 4 | 24 | 3 | — | 4 | 4 | 24 | 0 | — | 0 | 0 |
| 12 | 1 | 24 | 6 | 6 | 8 | 8 | 23 | 0 | 0 | 1 | 1 |
|   | 2 | 24 | 0 | 0 | 0 | 0 | 24 | 0 | 0 | 0 | 0 |
|   | 3 | 24 | 2 | 3 | 6 | 6 | 24 | 0 | 0 | 0 | 0 |
|   | 4 | 23 | 13 | 13 | 17 | 17 | 22 | 4 | 4 | 6 | 6 |
| 19 | 1 | 23 | 7 | 7 | 7 | 8 | 23 | 0 | 0 | 0 | 0 |
|   | 2 | 23 | 0 | 0 | 0 | 0 | 24 | 0 | 0 | 0 | 0 |
|   | 3 | 24 | 4 | 4 | 4 | 4 | 24 | 0 | 0 | 0 | 0 |
|   | 4 | 24 | 7 | 8 | 9 | 10 | 24 | 5 | 5 | 8 | 10 |
| 26 | 1 | 23 | 9 | 8 | 9 | 10 | 23 | 4 | 3 | 4 | 4 |
|   | 2 | 24 | 0 | 0 | 0 | 0 | 24 | 0 | 0 | 0 | 0 |
|   | 3 | 23 | 4 | 4 | 5 | 6 | 24 | 0 | 0 | 0 | 0 |

TABLE X-continued

| Days in Controlled Atmosphere (34° F.) | Treat-ment* | Number of Unacceptably Discolored Chops | | | | | | | | |
|---|---|---|---|---|---|---|---|---|---|---|
| | | Low pH Loin (pH about 5.5) | | | | | High pH Loin (pH about 5.8) | | | |
| | | Total No. of Chops | Days in Display at 38° F. | | | | Total No. of Chops | Days in Display at 38° F. | | |
| | | | 0 | 1 | 2 | 3 | | 0 | 1 | 2 | 3 |
| | 4 | 23 | 13 | 12 | 14 | 15 | 24 | 7 | 5 | 7 | 7 |

*The treatments used were:
1. Aqueous solution containing 3.3 weight percent sodium tripolyphosphate was pumped (injected) into the chops in an amount equal to 10 weight percent, based on the weight of the meat.
2. An aqueous buffer solution containing 3.3 weight percent sodium pyrophosphate, 0.45 weight percent ascorbic acid and 0.25 weight percent citric acid pumped into the chops in an amount equal to 10 weight percent, based on the weight of the meat.
3. Same buffer solution as treatment 2, except sprayed on in an amount equal to 3 weight percent, based on the weight of the meat.
4. Control - no pretreatment before packing in controlled atmosphere.

EXAMPLE 3

Meat surface color tests were carried out on a group of untreated pork chops having a pH of about 5.5, and on a second group of chops having a pH of about 5.8, after both types of chops had been packed in a controlled atmosphere containing 60 percent $CO_2$, 10 percent $O_2$ and 30 percent $N_2$. These chops were periodically tested to determine the effective color shelf life of the chops, and these results are graphically portrayed in FIG. 2 of the drawings. The surface color values which are here used on the ordinate of the graph range from 1 to 7, and the meanings of the assigned values are those which are explained in connection with Table IV above. A color value lower than 4 is generally unacceptable.

Figure 2:
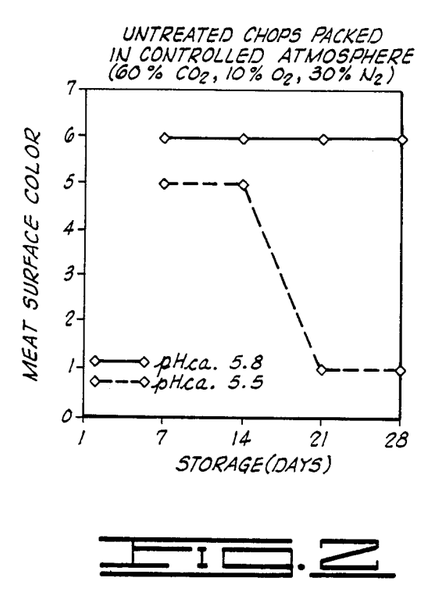
FIG. 2 is a graph showing a type and duration of meat surface color of chops having a pH of about 5.5 and about 5.8 when packed in a controlled gaseous atmosphere without any type of pretreatment.

As shown in FIG. 2, untreated cuts of relatively lower pH (about 5.5) have a marginally acceptable initial surface color, and the surface color deteriorates relatively rapidly, so that very shortly after 14 days in storage, the color of the chops is clearly unacceptable. The chops having a relatively higher pH of about 5.8 have relatively good color stability when packed in the relatively high $CO_2$ atmosphere, and this true although these chops have not been pretreated with any solution to purposely undertake to stabilize or elevate the surface color of the meat. As shown in FIG. 2, the high pH chops had a relatively stable surface color value of 6 for a storage period of 28 days.

EXAMPLE 4

Figure 3:
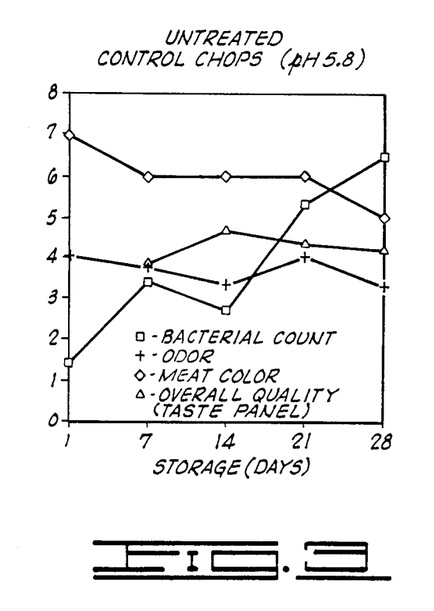
FIGS. 3 and 4 are graphs portraying various properties displayed by pork chops having a pH of about 5.8 both where the chopos have been pretreated with the buffer solution of this invention, and where no pretreatment has been carried out.
Figure 4:
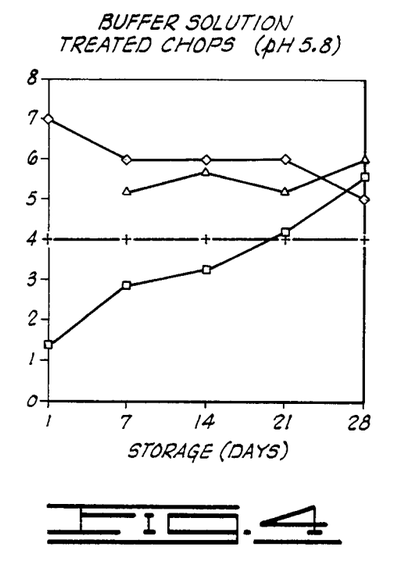

FIGS. 3 and 4 are graphs which undertake to compare various characteristics or properties of untreated pork chops having a pH of about 5.8, and stored in a controlled atmosphere over an extended period, with the properties of chops of about the same pH which have been pretreated with the buffer solution of the present invention, and them similarly stored. The aqueous buffer solution pretreatment was effective to incorporate into the treated meat, about 0.33 weight percent of sodium pyrophosphate, about 0.045 weight percent of ascorbic acid and about 0.025 weight percent of citric acid. Both the untreated control chops and the treated chops were packed in the controlled atmosphere described in Example 3.

In referring to FIGS. 3 and 4, the legend identifies the several meat characteristics and properties graphed. A microbial total plate count incubated at 10° C. was obtained, and was measured in $\log_{10}$ count per square inch of meat surface. The odor is here measured on a scale of from 1 to 4 with the relatively lower values indicating a relatively more offensive odor, and the relatively higher values indicating more acceptable meat in terms of the absence of off-odor. The meat surface color scale of from 1 to 7 is that which has already been explained in Example 3, and in referring to Table IV. The overall quality (taste panel scores) is also measured on a 1 to 7 scale, with the higher quality being indicated by a higher value.

As FIGS. 3 and 4 are compared, it will be noted that treatment with the buffer solution of the present invention, followed by storage of the chops in a controlled atmosphere, substantially improves the odor characteristic of the chops and aids the controlled atmosphere in suppressing microbial activity beyond the 14th day of storage. The overall quality of the chops, including taste tests by a taste panel, is substantially higher in the case of the buffer solution treated chops than in the case of the untreated chops.

EXAMPLE 5

Figure 5:
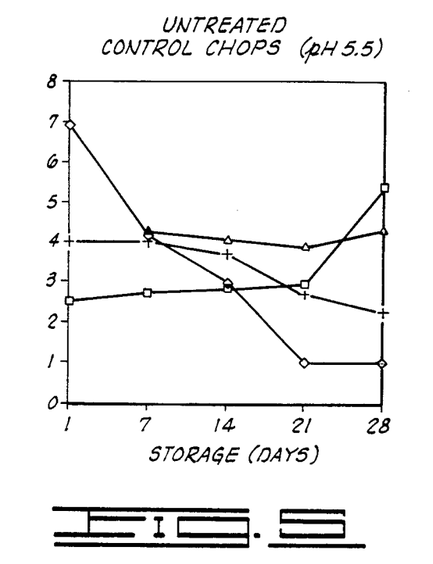
FIGS. 5 and 6 are graphs similar to FIGS. 3 and 4, but depicting the results obtained using untreated and treated chops, respectively, having a pH of about 5.5.
Figure 6:
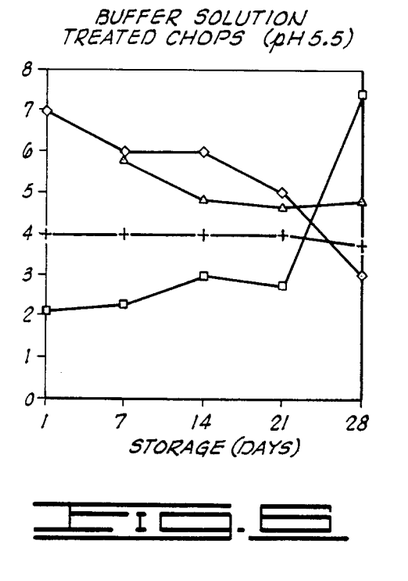

In similar fashion to the tests carried out on chops having a pH of about 5.8 to develop the data graphed in FIGS. 3 and 4, similar tests on treated and untreated chops having a pH of about 5.5 were carried out to develop the data graphed in FIGS. 5 and 6. In FIG. 5, chops having a pH of about 5.5, but not pretreated (and thus constituting the control chops), were placed in a controlled atmosphere of the type described in Example 3. Other chops having a relatively low pH of about 5.5 were treated using the buffer solution of the present invention having the composition referred to above in explaining the treatment of the chops tested, and the results tabulated in FIG. 6. In FIGS. 5 and 6 portraying the results of testing the treated chops of pH 5.5, the same properties and characteristics were tested, and the plotted data lines are illustrated using the same data point symbols, as are described in the legend appearing in FIG. 3 of the drawings.

When FIGS. 5 and 6 are compared, it will be noted that the color of the untreated control chops rapidly deteriorates and becomes unacceptable after about 8 days. The color is stabilized, however, in the case of the lower pH chops treated with the buffer solution of the invention, and then packed in the controlled atmosphere. Here the color remains of acceptable value for a period in excess of 21 days. It will also be noted that in the case of both the untreated and buffer solution treated chops, the relatively high carbon dioxide modified atmosphere effectively inhibits microbial growth to unacceptable levels until post-28 day storage.

Comparison of FIGS. 5 and 6 also shows that the odor characteristic of the treated chops is improved over that which characterizes the chops which were untreated. The overall quality (taste panel scores) of the treated chops was also better than those which had not received any pretreatment.

EXAMPLE 6

Figure 7:
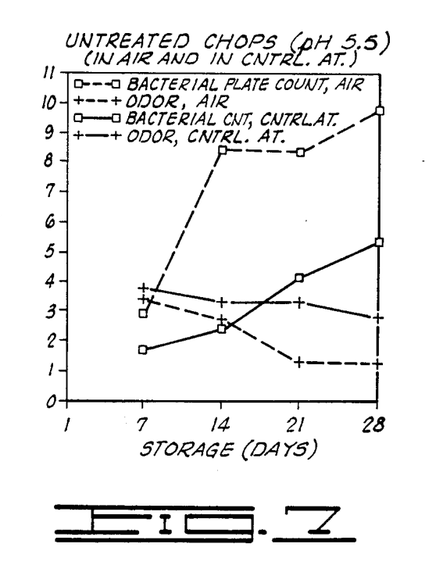
FIG. 7 is a graph illustrating how the bacterial count and odor of untreated chops of pH 5.5 are affected by extended storage in a high $CO_2$ controlled atmosphere as compared to air.

The effect of the storage of pork chops in a controlled atmosphere, vis-a-vis air, is graphically portrayed in FIG. 7 of the drawings. Here, untreated chops having a pH of about 5.5 are divided into two groups. One of the groups of chops is packaged in air; the other is packaged in a controlled atmosphere of the composition described in Example 3. Over a 28-day storage period, the bacterial count development in air has been measured at 7-day intervals, as has the odor. FIG. 7 shows that the pH 5.5 chops which are packed in the controlled atmosphere substantially inhibits bacterial growth and prevents the development of significant off-odor.

EXAMPLE 7

Table XI and FIGS. 9–15 of the drawings enable a comparison to be made of the shelf life days of acceptable meat color and overall appearance of pork chops which have had no pretreatment and chops which have been variously pretreated. The treated chops used in these tests were all from the same loin, and after pretreatment each had a pH in the range of from about 5.5 to about 5.8. All of the chops were packaged in an atmosphere which contained about 60 percent $CO_2$, about 10 percent $O_2$ and about 30 percent $N_2$.

TABLE XI

| Treatment Code | Component Present and Composition | | | Shelf-Life (Day)* | | pH of Chop | Percent Purge | TBA Lean | Ascorbic Acid Level (ppm) (day) | Off-Odor | |
|---|---|---|---|---|---|---|---|---|---|---|---|
| | Phosphates (0.33%) | Ascorbic Acid (450 ppm) | Citric Acid (100 ppm) | Meat Color | Overall Appearance | | | | | Meat | Bone |
| 1 | No Treatment | | | 7 | 7 | 5.58 | 5.85 | .20 | | 4.0 | 2.7 |
| 2 | X | X | X | 28 | 28 | 5.74 | 2.75 | .72 | 210 (14) 130 (21) 90 (28) | 4.0 | 4.0 |
| 3 | X | X | | 21 | 21 | 5.72 | 1.91 | .25 | 150 (14) 90 (21) 60 (28) | 4.0 | 4.0 |
| 4 | X | | X | 21 | 21 | 5.66 | 1.87 | .33 | | 4.0 | 3.3 |
| 5 | | X | X | 21 | 21 | 5.57 | 8.07 | .23 | 160 (14) 110 (21) 80 (28) | 3.7 | 3.7 |
| 6 | X | | | 28 | 21 | 5.79 | 2.19 | .38 | | 4.0 | 3.0 |
| 7 | | X | | 21 | 21 | 5.62 | 7.54 | .38 | 140 (14) 90 (21) 60 (28) | 4.0 | 3.7 |
| 8 | | | X | 14 | 14 | 5.51 | 8.84 | .54 | | 4.0 | 3.3 |

*Shows the day after packing when color and overall appearance became unacceptable.

sphere exhibit a substantially suppressed microbial growth, and thus have a quite acceptable bacterial level after 28 days of storage. The chops packaged in the controlled atmosphere also exhibit a markedly better odor characteristic at the 28-day test and subsequently thereto, as compared to chops packed in air.

Figure 8:
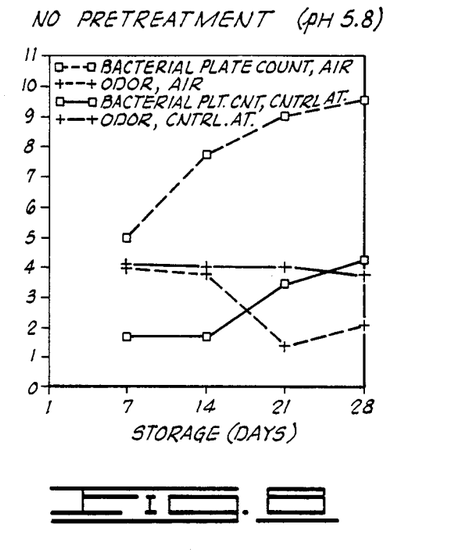
FIG. 8 is a graph similar to FIG. 7, except showing results of microbial and odor tests carried out using chops having a pH of about 5.8.
Figure 9:
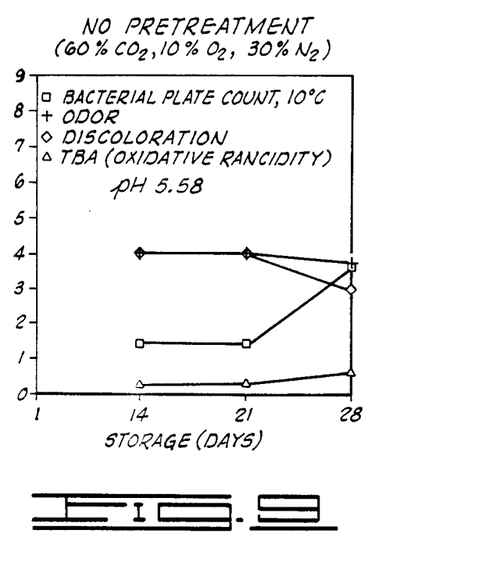
FIGS. 9–15 are graphs which show the results obtained when a number of characteristics of pork chops having pH values in the range of from about 5.5 to about 5.8 (after pretreatment) are observed or measured after pretreating the chops in various ways and then packing them in a controlled atmosphere over a period of twenty-eight days.
Figure 10:
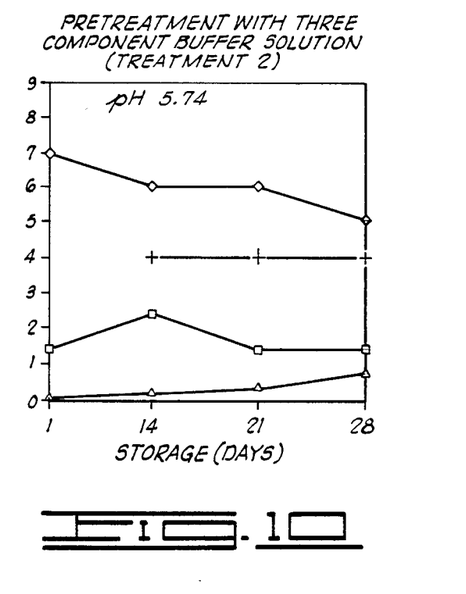
Figure 11:
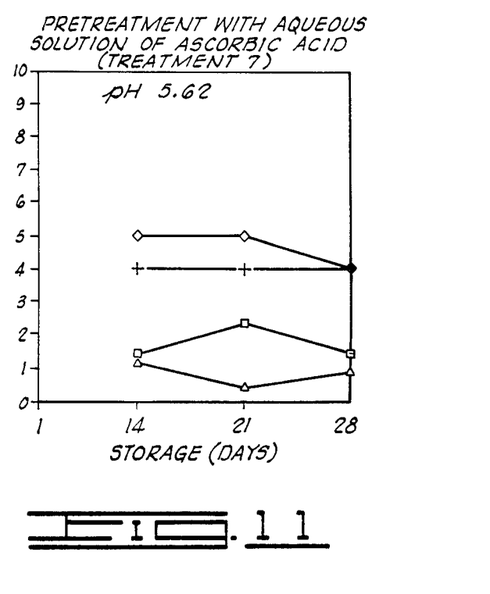
Figure 12:
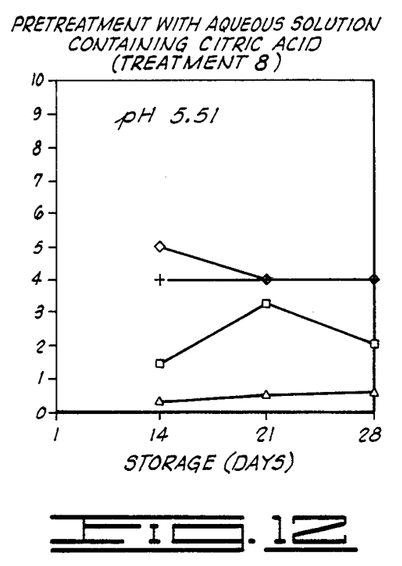
Figure 13:
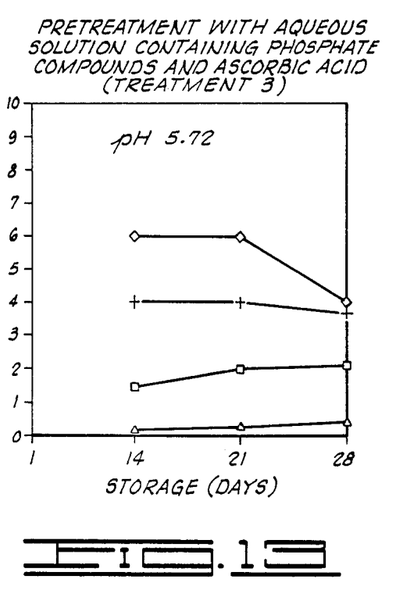
Figure 14:
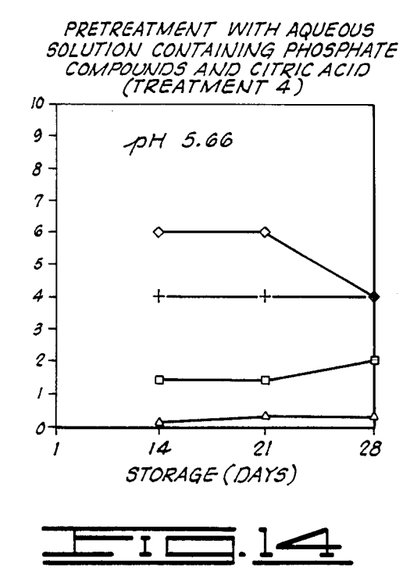
Figure 15:
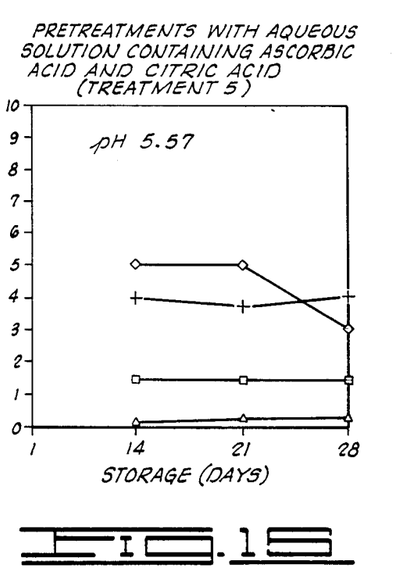
Figure 16:
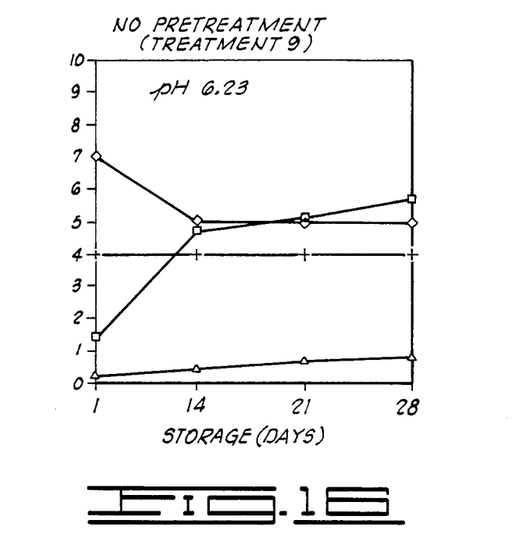
FIGS. 16–23 are graphs similar to those shown in FIGS. 9–15, but based upon tests carried out using pork chops having pH values in the range of from about 6.2 to about 6.6 (after treatment).
Figure 17:
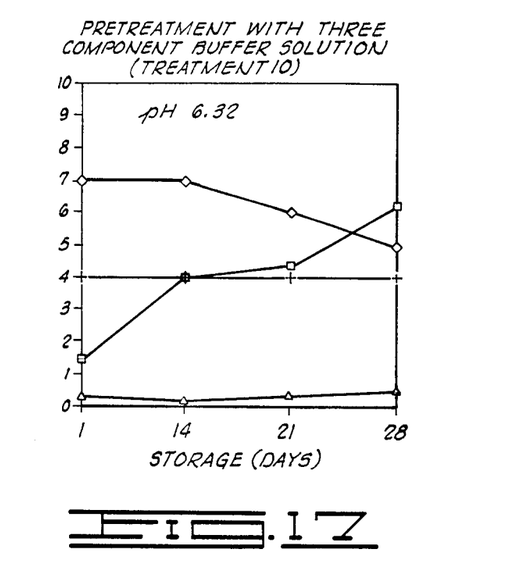
Figure 18:
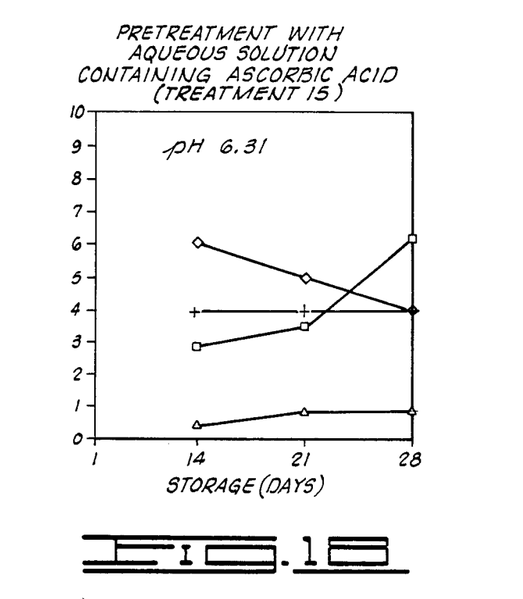
Figure 19:
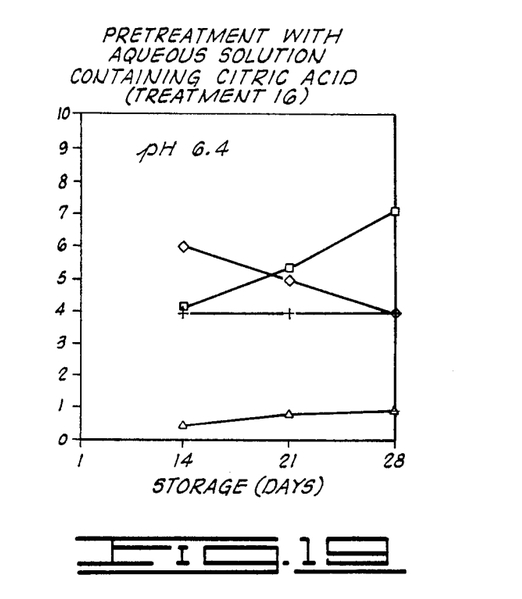
Figure 20:
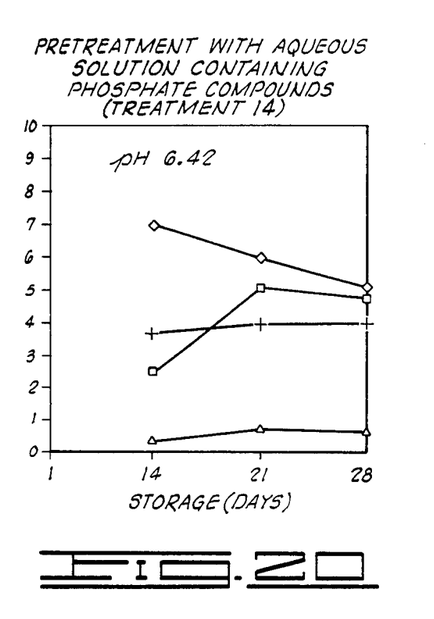
Figure 21:
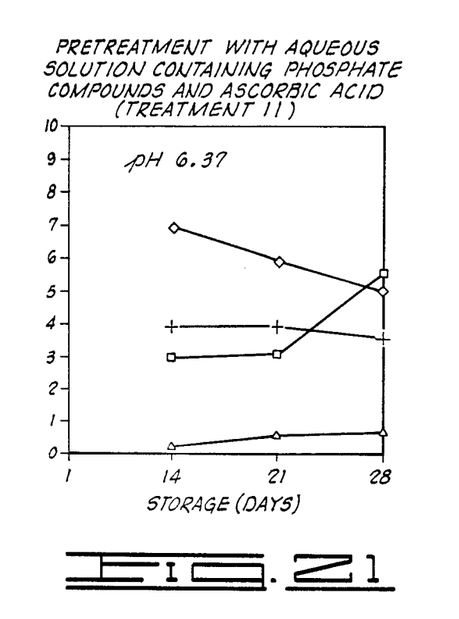
Figure 22:
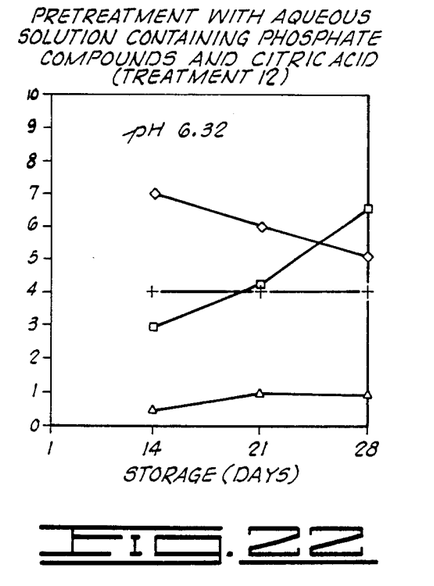
Figure 23:
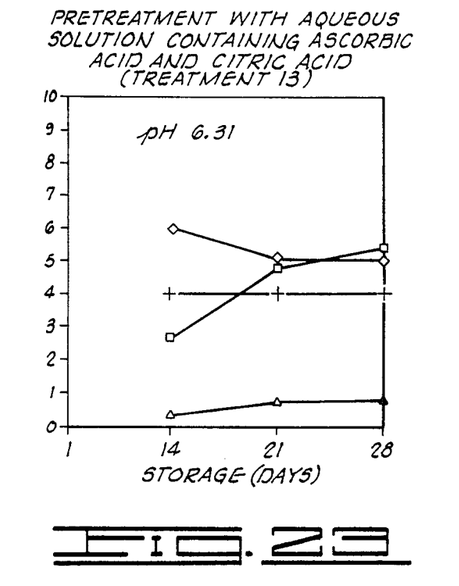

FIG. 8 is a graphic portrayal of the results obtained when pork chops having a pH of about 5.8 are packaged in air and in relatively high $CO_2$ controlled atmosphere. Again, it will be noted that the use of the controlled The results tabulated in Table XII and graphed in FIGS. 16–23 show the results of various treatments of pork chops derived from the same loin. After pretreatment with various aqueous solutions, the chops had the pH values shown in the table in the range of from about 6.2 to about 6.5. These chops were packaged in the same contolled gaseous atmosphere as that used in the tests yielding the results tabulated in Table XI.

TABLE XII

| Treatment Code | Component Present and Composition | | | Shelf-Life (Day)* | | pH of Chop | Percent Purge | TBA Lean | Ascorbic Acid Level (ppm) (day) | Off-Odor | |
|---|---|---|---|---|---|---|---|---|---|---|---|
| | Phosphates (0.33%) | Ascorbic Acid (450 ppm) | Citric Acid (100 ppm) | Meat Color | Overall Appearance | | | | | Meat | Bone |
| 9 | No Treatment | | | 28 | 28 | 6.23 | 4.66 | .73 | | 4.0 | 4.0 |
| 10 | X | X | X | 28 | 28 | 6.32 | 1.00 | .48 | 140 (14) 70 (21) 40 (28) | 4.0 | 4.0 |
| 11 | X | X | | 28 | 28 | 6.37 | 0.69 | .70 | 110 (14) 70 (21) 50 (28) | 3.7 | 3.3 |
| 12 | X | | X | 28 | 28 | 6.32 | 0.87 | .87 | | 4.0 | 3.7 |
| 13 | | X | X | 28 | 21 | 6.31 | 4.63 | .72 | 80 (14) 50 (21) 40 (28) | 4.0 | 3.7 |
| 14 | X | | | 28 | 28 | 6.42 | 0.84 | .69 | | 4.0 | 3.3 |
| 15 | | X | | 21 | 21 | 6.31 | 5.46 | .92 | 80 (14) 60 (21) 40 (28) | 4.0 | 3.7 |
| 16 | | | X | 21 | 21 | 6.40 | 5.09 | .94 | | 4.0 | 3.7 |

*Shows the day after packing when color and overall appearance became unacceptable.

It will be noted from a comparison of Tables XI and XII and the graphs based thereon, that the chops derived from the relatively high pH loins exhibit an acceptable color shelf life of about 28 days without benefit of any pretreatment. The relatively low pH chops, however, when not treated prior to packing in the controlled atmosphere, exhibit a color shelf life of only about 7 days. The data appearing in Tables XI and XII further show that the buffer solution containing all three of the active components hereinbefore described functions more effectively in extending the meat color shelf life and the overall appearance shelf life that does a solution which contains only one or even two of these components. This is most apparent in the case of the relatively low pH chops, but it is also easily discernible from a close comparison of the overall values obtained in the testing of the relatively higher pH chops.

It will be noted in referring to Tables XI and XII that the decomposition rate of the ascorbic acid component is tabulated. This value is of interest in that it is desirable for as little of the ascorbic acid as possible to remain at the time of consumer acquisition after about 21 days.

Although a preferred embodiment of the invention has been herein described in order to provide an adequate illustration of the principles upon which the invention is based, it will be understood that various changes and innovations can be effected in the described procedures without departure from these principles. Changes and modifications of this type are therefore deemed to be circumscribed by the spirit and scope of the invention, except as the same may be necessarily limited by the appended claims, or reasonable equivalents thereof.

What is claimed is:

1. A process for the pre-packing of sub-primal fresh pork cuts sized for sale to the consumer in order to enhance and extend the color shelf-life and the microbial shelf-life of the cuts, and to improve the organoleptic qualities of the cuts, without selective pre-screening based upon chemical testing to determine the pH of the cuts or other properties, which process comprises carrying out two steps in sequence as follows:

contacting the fresh pork cuts with an aqueous solution which contains:
  (a) a phosphate compound selected from the group of phosphate compounds which includes the alkali metal orthophosphates, the alkali metal pyrophosphates, the alkali metal tripolyphosphates and the alkali metal hexametaphosphates, said phosphate compound being used in an amount of from about 0.1 weight percent to about 2.0 weight percent of the fresh pork cuts so treated and contacted;
  (b) a reducing compound selected from the group consisting of ascorbic acid, iso-ascorbic acid, the alkali metal salts of said acids, and reductic acid, said reducing compound being used in an amount which is from about 0.01 weight percent to about 0.1 weight percent of the total weight of the contacted and treated fresh pork cuts; and
  (c) a sequestering agent selected from the group consisting of citric acid, tartaric acid, ethylenediaminetetracetric acid, and the sodium and potassium salts of such acids, so as to place in the thus treated pork, from about 0.01 weight percent to about 0.2 weight percent of the sequestering agent; then thereafter packaging the thus treated pork cuts in a controlled gaseous atmosphere which includes, in gaseous admixture, from about 2 percent to about 25 percent oxygen, and from about 20 percent to about 80 percent carbon dioxide, with the balance being nitrogen, whereby the properties of the thus treated and packaged fresh pork cuts are improved and remain good for a period of at least about 21 days, and so that the pork cuts have a color shelf-life of at least about 21 days, and a microbial shelf-life which is at least as long as the color shelf-life, so that there is no masking of bacterial spoilage resulting from a longer color shelf-life than microbial shelf-life, and so that all of the cuts so treated have substantially uniform shelf-life properties and substantially uniformly good organoleptic properties, regardless of the pH condition of the chops at the outset of the treatment.

2. A process as defined in claim 1 wherein from about 0.2 weight percent to about 0.5 weight percent of said phosphate compound, from about 0.02 weight percent to about 0.05 weight percent of said reducing compound, and from about 0.01 weight percent to about 0.05 weight percent of said sequestering agent are placed in the pork by said contacting step.

3. A process as defined in claim 2 wherein the sequestering agent utilized is citric acid.

4. A process as defined in claim 1 wherein the gaseous mixture contains about 13 percent oxygen and about 50 percent carbon dioxide.

5. A process as defined in claim 4 wherein the sequestering agent utilized is citric acid.

6. A process as defined in claim 5 wherein the treated pork placed in the sealed package is pork chops.

7. A process as defined in claim 4 wherein the placement of the treated pork in the sealed package entails the steps of:
  placing at least one pork chop on each of a plurality of semi-rigid trays;
  placing said gaseous mixture over and around the chops on each of said trays;
  sealing said trays with a gas permeable film; then
  placing a plurality of said trays on a thermoformed tray; and
  covering and sealing said thermoformed tray with a gas impermeable film.

8. A process as defined in claim 1 wherein said aqueous buffer solution is placed in the pork by injection.

9. A process as defined in claim 1 wherein said aqueous buffer solution is placed in the pork by emersing the pork in the buffer solution and marinating the pork.

10. A process as defined in claim 1 wherein said aqueous buffer solution is placed in the pork by spraying the pork with the buffer solution.

11. A process as defined in claim 1 wherein the treated pork placed in the sealed package is pork chops, and the placement in the package entails the steps of:
  placing at least one pork chop on each of a plurality of semi-rigid trays;
  placing said gaseous mixture over and around the chops on each of said trays;
  sealing said trays with a gas permeable film; then
  placing a plurality of said trays on a thermoformed tray; and
  covering and sealing said thermoformed tray with a gas impermeable film.

12. A process as defined in claim 11 and further characterized as including placing said gaseous mixture over and around the trays and within said gas impermeable film.

13. A process as defined in claim 12 wherein said gaseous mixture contains about 13 percent oxygen and about 50 percent carbon dioxide.

14. A process as defined in claim 1 and further characterized by the additional step of retaining the packaged meat at a temperature of 34°±2° F. during the shipment and storage thereof.

15. A process as defined in claim 1 wherein said buffer solution has a pH of from about 5.0 to about 8.0.

* * * * *